United States Patent Office 2,982,658
Patented May 2, 1961

2,982,658
METHOD FOR COATING ARTICLES OF FOOD AND COMPOSITION THEREFOR

Edward S. Naidus, Marblehead, Mass., and Leonard F. Betts, Livonia, Mich., assignors to Wasco Chemical Co., Inc., Sanford, Maine, a corporation of Maine No Drawing. Filed Apr. 11, 1957, Ser. No. 652,109

9 Claims. (Cl. 99—166)

In preserving various types of food such as meats, fowl, fish, eggs, butter, cheese, fruits and vegetables it is necessary to provide a relatively impervious film which not only prevents contamination, but also drying out, discoloration, and oxidative degradation. Such a film or coating must be continuous and free from pin holes, cracks and the like imperfections, flexible at temperatures as low as −20 degrees F., shatter-proof, non-adherent, odorless, tasteless and non-toxic, and preferably transparent, although a translucent or opaque coating may be of value in some applications. In addition, the decomposition or smoke point should be preferably of the order of 300° F. or greater and the composition should be stable in the melt, with little discoloration or odor development, and the material should not include solvents or the like which might produce gaseous inclusions when heated. Another requirement is that the material should have a melting point not less than approximately 150° F. so that the transformation from liquid to solid state is rapid, thereby permitting the protective coating to be efficiently applied, as well as providing a bacteriostatic or bactericidal effect because of the elevated temperatures.

The principal object of the invention is to provide a relatively inexpensive composition which not only meets the aforementioned requirements, but also satisfies the various legal requirements for food use. Further objects will be apparent from a consideration of the following disclosure which sets forth illustrative compositions.

We have found that when a film former such as ethyl cellulose is plasticized with one or more primary plasticizers such as the condensation product of certain dibasic acids and a reactive oxy-compound, such as certain polyhydric alcohols, epi-chlorohydrin or ethylene oxide, and a secondary plasticizer, such as a straight vegetable oil, a hydrogenated vegetable oil, a pure paraffin base mineral oil and jelly or mixtures of the above, there is produced a composition which has a melting point or range between 180° and 400° F. and which, when applied to a food product by conventional techniques such as, brushing or dipping, produces a continuous film having the aforementioned properties.

In accordance with the present invention 100 parts (by weight) of ethyl cellulose preferably having a viscosity of the order of 50 centipoises and having an ethoxyl content from 44 to 50%, are mixed with from 40 to 75 parts (by weight) of a primary plasticizer consisting of a reaction product of either sebacic acid or adipic acid and epichlorohydrin or ethylene oxide (Paraplex G-60), or a mixture of approximately 1:1 to 4:1 of such a plasticizer and 2-ethyl hexyl diphenyl phosphate (141 Santicizer), after which from 150 to 300 parts of white mineral oil or other secondary plasticizer is incorporated. The components may be mixed in a jacketed W & P mixer or the like apparatus until uniformly blended, after which the mixture may be transferred to a jacketed kettle or vat. If desired, approximately 0.1 to 2 parts of an antioxidant such as butyl hydroxy anisole (BHA), butyl hydroxy toluene (BHT), or propyl gallate may be incorporated to improve the life of the composition and the food product. In addition, an inert gas blanket may be maintained during processing to minimize discoloration.

The preferred vegetable oils are peanut oil, coconut oil, palm oil, babassu oil, and palm kernel, all of which may be used in place of or along with the white mineral oil, and such oils may or may not be hydrogenated. If desired a purified petroleum jelly may be used along with or in place of the white mineral oil, and where a higher film strength of the composition is desired a low molecular weight polyethylene may replace a minor part of the secondary plasticizer.

Compositions prepared in accordance with the present invention satisfy the aforementioned requirements and are deemed to comply with the various legal requirements. Since such compositions are fluid at temperature between 180° and 400° F. it is preferable to dip the food product in the molten compound, although application by brushing or otherwise is feasible.

Illustrative compositions and a method of preparation are as follows:

*Example 1*

A jacketed mixer is charged with 13.5 pounds of water-white mineral oil (L. Sonneborn) and 4.0 pounds of the condensation product of epichlorohydrin and sebacic acid (Paraplex G-60) and 1.5 pounds of 2-ethyl hexyl diphenyl phosphate (Santicizer 141) are added, followed by 0.1 pound of butyl hydroxy toluene (Tenox BHT). The ingredients are heated to at least 130° F. and the mixing is continued until uniformly mixed, after which 6.0 pounds of ethyl cellulose (47.5–49% ethoxyl) (Hercules 50S) are added gradually with continued stirring. Additional heat is usually required and the final solution is completed at 300° F. to 400° F. The mixing may be accomplished in a continuous manner by predispersing the various ingredients and introducing the dispersion into a flow-type heated mixer, and in either case the resulting composition is a pale amber, clear liquid which may be used directly for coating, or converted to convenient solid form for remelting.

*Example 2*

The same procedure set forth in Example 1 was followed, except that 12.0 pounds of white mineral oil and 3.0 pounds of Santicizer 141 were used in place of the amounts used in the above example. The resulting composition was identical in all material particulars.

*Example 3*

The procedure set forth in Example 1 was followed except that 13.5 pounds of coconut oil were used in place of the mineral oil. The resulting composition was substantially identical with that of Example 1, except that the film produced was transparent at room temperature but on cooling to −20° F. became translucent to opaque.

*Example 4*

The procedure set forth in Example 1 was followed, except that 13.5 pounds of hydrogenated vegetable oil (Crisco) were used in place of mineral oil, and on cooling the resulting composition produced a translucent film, but otherwise substantially the same as the foregoing.

*Example 5*

In this example 4.5 pounds of ethyl cellulose and 1.5 pounds of low molecular weight polyethylene (Semet-Solvay) AC No. 6 were used with the other ingredients set forth in Example 1, and on cooling the resulting composition produced a translucent film, but otherwise was substantially the same as the foregoing.

*Example 6*

The procedure set forth in Example 1 was followed using a purified petroleum jelly in place of the white mineral oil and the resulting composition was substantially the same.

It is to be understood that this disclosure is for the purpose of illustration and that various modifications may be made without departing from the spirit and scope of the present invention as set forth in the appended claims.

We claim:

1. Method for coating articles of food which comprises the steps of (1) applying to the article, while it is being maintained at a relatively lower temperature, a thin enveloping film of a coating from a composition in molten form comprising essentially (a) from 21 to 35 percent by weight of the composition of an ethyl cellulose having an ethoxyl content between about 47.5 and 50% by weight and a viscosity in the order of 50 centipoises; (b) between about 52 and 63 percent of a refined mineral oil; and (c) between 14 and 16 percent by weight, based on the weight of the composition, of a colorless, odorless non-toxic plasticizer component which is a solvent for the cellulose ether; and (2) cooling the applied coating on the article to a hardened condition.

2. A protective coating composition for the preservation of foods, consisting essentially of approximately 100 parts (by weight) of ethyl cellulose having an ethoxyl content of from 44 to 50%; from 40 to 75 parts (by weight) of a primary plasticizer consisting essentially of the reaction product of a dibasic acid selected from the group consisting of sebacic and adipic acids and a reactive oxy-compound selected from the group consisting of epi-chlorohydrin and ethylene oxide; and from 150 to 300 parts (by weight) of a secondary plasticizer selected from the group consisting of white mineral oil, pure petroleum jelly, straight edible vegetable oils, hydrogenated vegetable oils and mixtures thereof with minor amounts based on said secondary plasticizer of low molecular weight polyethylene, said composition being fluid at a temperature between 180° and 400° F., and normally solid at temperatures below 180° F.

3. A protective coating composition for the preservation of foods, consisting essentially of approximately 100 parts (by weight) of ethyl cellulose having an ethoxyl content of from 44 to 50%; from 40 to 75 parts (by weight) of a primary plasticizer consisting essentially of a mixture of 1:1 to 1:4 of 2-ethyl hexyl diphenyl phosphate and the reaction product of a dibasic acid selected from the group consisting of sebacic and adipic acids and a reactive oxy-compound selected from the group consisting of epi-chlorohydrin and ethylene oxide; and from 150 to 300 parts (by weight) of a secondary plasticizer selected from the group consisting of white mineral oil, pure petroleum jelly, straight edible vegetable oils, hydrogenated vegetable oils and mixtures thereof with minor amounts based on said secondary plasticizer of low molecular weight polyethylene, said composition being fluid at a temperature between 180° and 400° F., and normally solid at temperatures below 180° F.

4. A protective coating for the preservation of foods consisting essentially of approximately 4 to 6 parts (by weight) of ethyl cellulose having an ethoxyl content of from 47.5 to 49%; approximately 5 to 7 parts (by weight) of a primary plasticizer consisting essentially of the reaction product of a dibasic acid selected from the group consisting of sebacic and adipic acids and a reactive oxy-compound selected from the group consisting of epi-chlorohydrin and ethylene oxide; and approximately 12 to 14 parts (by weight) of a secondary plasticizer selected from the group consisting of while mineral oil, pure petroleum jelly, straight edible vegetable oils, hydrogenated vegetable oils and mixtures thereof with minor amounts based on said secondary plasticizer of low molecular weight polyethylene, said composition being fluid at a temperature between 180° and 400° F. and normally solid below 180° F.

5. A protective coating for the preservation of foods, consisting essentially of approximately 6 parts (by weight) of ethyl cellulose having an ethoxyl content from 47.5 to 49%; a primary plasticizer consisting essentially of approximately 4 parts (by weight) of the condensation product of epichlorohydrin and sebacic acid and 1.5 parts (by weight) of 2-ethyl hexyl diphenyl phosphate; and a secondary plasticizer consisting essentially of approximately 13.5 parts (by weight) of white mineral oil.

6. A protective coating for the preservation of foods, consisting essentially of approximately 6 parts (by weight) of ethyl cellulose having an ethoxyl content from 47.5 to 49%; a primary plasticizer consisting essentially of approximately 4 parts (by weight) of the condensation product of epichlorohydrin and sebacic acid and 3 parts (by weight) of 2-ethyl hexyl diphenyl phosphate; and a secondary plasticizer consisting essentially of approximately 12 parts (by weight) of white mineral oil.

7. A protective coating for the preservation of foods, consisting essentially of approximately 6 parts (by weight) of ethyl cellulose having an ethoxyl content from 47.5 to 49%; a primary plasticizer consisting essentially of approximately 4 parts (by weight) of the condensation product of epichlorohydrin and sebacic acid and 1.5 parts (by weight) of 2-ethyl hexyl diphenyl phosphate; and a secondary plasticizer consisting essentially of approximately 13.5 parts (by weight) of palm oil.

8. A protective coating for the preservation of foods, consisting essentially of approximately 6 parts (by weight) of ethyl cellulose having an ethoxyl content from 47.5 to 49%; a primary plasticizer consisting essentially of approximately 4 parts (by weight) of the condensation product of epichlorohydrin and sebacic acid and 1.5 parts (by weight) of 2-ethyl hexyl diphenyl phosphate; and a secondary plasticizer consisting essentially of approximately 13.5 parts (by weight) of hydrogenated vegetable oil.

9. A protective coating for the preservation of foods, consisting essentially of approximately 4.5 parts (by weight) of ethyl cellulose having an ethoxyl content from 47.5 to 49%; a primary plasticizer consisting essentially of approximately 4 parts (by weight) of the condensation product of epichlorohydrin and sebacic acid and 1.5 parts (by weight) of 2-ethyl hexyl diphenyl phosphate; and a secondary plasticizer consisting essentially of approximately 13.5 parts (by weight) of white mineral oil and approximately 1.5 parts (by weight) of a low molecular weight polyethylene.

References Cited in the file of this patent

UNITED STATES PATENTS

| | | |
|---|---|---|
| 1,900,507 | Lewers et al. | Mar. 7, 1933 |
| 2,129,156 | Trolander et al. | Sept. 6, 1938 |
| 2,215,250 | Pedersen | Sept. 17, 1940 |
| 2,394,101 | Phillips et al. | Feb. 5, 1946 |
| 2,465,472 | Paist | Mar. 29, 1949 |
| 2,793,959 | Pospychala et al. | May 28, 1957 |
| 2,840,474 | Wirt et al. | June 24, 1958 |

FOREIGN PATENTS

| | | |
|---|---|---|
| 418,506 | Great Britain | Oct. 17, 1934 |
| 428,160 | Great Britain | May 8, 1935 |

OTHER REFERENCES

"Plastics," 1949, by Fleck, Second Revised Edition, page 343.